United States Patent Office 3,510,255
Patented May 5, 1970

---

3,510,255
RECOVERY OF SODIUM ALUMINATE FROM DAWSONITE
Robert N. Hall, Boulder, and Frank C. Haas, Arvada, Colo., assignors to The Oil Shale Corporation, New York, N.Y., a corporation of Nevada
No Drawing. Filed May 25, 1967, Ser. No. 641,166
Int. Cl. C01f 7/08
U.S. Cl. 23—52        10 Claims

ABSTRACT OF THE DISCLOSURE

A process for recovering a water-soluble sodium aluminate from a dawsonite-bearing matrix which involves roasting the dawsonite-bearing matrix at an elevated temperature of about 1000–1400° F. to form a blend of sodium aluminate and spent residue; and leaching the blend at low temperature and atmospheric pressure with a leach liquor, which is water, or an aqueous soda ash solution, to extract the sodium aluminate therefrom.

---

The present invention relates to a process for the recovery of a water-soluble aluminate from a dawsonite-bearing matrix.

Dawsonite is a basic sodium aluminum carbonate having the formula $$NaAlCO_3(OH)_2$$

This mineral, until recently, has not been of great importance. However, as the world's supply of the chief aluminum-bearing mineral, namely bauxite, diminishes, there is increasing emphasis on other sources of aluminum-bearing minerals. One such source of aluminum is dawsonite which is found in association with oil shale, quartz, feldspar and other matrices. Morever, in view of the increasing world interest in the recovery of oil from oil shale due to the depletion of petroleum reserves, there is now a greater demand for making the shale oil extraction process more economically attractive. To this end, attempts have been made to develop an economical method for the recovery of aluminum values present in the dawsonite-bearing oil shale found in the western state of Colorado, and throughout the world.

Previous efforts toward the recovery of aluminum values from dawsonite have met with little success, because they have been uneconomical in view of their dependence upon the use of large concentrations of costly acidic or alkaline leach liquors, and also the use of highly elevated temperatures and pressures during the leaching operation. It is, therefore, an object of the present invention to provide an economically attractive process for the recovery of aluminum values from dawsonite, and particularly from dawsonite found in association with oil shale.

In the process of the present invention for the recovery of sodium aluminate from a dawsonite-bearing matrix, such as oil shale, quartz, feldspar and the like, the dawsonite-bearing matrix is roasted at a temperature from about 1000° F. to about 1400° F. and preferably from about 1100° F. to about 1300° F. This roasting temperature is important because unexpectedly it was found that the use of lower or higher roasting temperatures causes a significant decrease in the amount of soluble sodium aluminate which is obtained. The roasting operation wherein sodium aluminate is formed is extremely rapid, that is less than about one minute, however, where the dawsonite-bearing matrix is oil shale, the roasting operation is continued until substantially all the carbon in the matrix is burned off. The time period therein depends on the roasting procedure and apparatus, but the operation generally occurs within about 0.5 to about 60 minutes. The product of the roasting operation is a blend of sodium aluminate and spent residue, such as shale ash and various mineral values. This blend is leached with a leach liquor.

The leaching operation is preferably conducted at atmospheric pressure although slight pressures may be utilized and at a temperature ranging from ambient temperature to about the boiling point of water, i.e. 212° F. rather than at heretofore requisite elevated pressures and temperatures. The leaching procedure is sufficiently complete within the time period of about 5 to about 60 minutes. The leaching liquors are preferably water or an aqueous soda ash solution. The latter solution preferably contains from about 1% to 30% (i.e. saturated) soda ash. Desirably the pH of the solution is maintained at about 9.5 to 13.0. In certain instances other aluminum-bearing minerals such as gibbsite, i.e. $Al_2O_3 \cdot 3H_2O$, are found in association with dawsonite. These additional aluminum minerals may be effectively recovered along with the dawsonitic aluminum by adding a small amount, preferably from about 0.2% to about 1% caustic to the soda ash leach solution. Alternatively, the caustic may be produced in the process through the addition of lime (calcium oxide) to the soda ash solution as hereinafter described. While the addition of small amounts of caustic soda increases the yield of aluminum values, its addition adversely affects the product purity by substantially increasing the silica content of the leach liquor. At higher caustic soda concentrations, it is believed the dawsonitic aluminum values form insoluble aluminum silicates. The leaching operation is generally conducted at a solids content of about 4–50%. The leaching operation extracts the soluble sodium aluminate from the spent residue.

When the dawsonite-bearing matrix is oil shale, the heat treatment of the oil shale is usually conducted in a two-step operation. Thus, the oil shale is pyrolyzed at a temperature of about 750–975° F. to yield shale oil vapors and spent shale preferably in a finely divided state. The shale oil hydrocarbonaceous vapors are then separated from the spent shale prior to roasting the spent shale which contains the aluminum values.

The recovery process of the invention can comprise further steps which involve the processing of the sodium aluminate obtained by the roasting and leaching steps. Thus the sodium aluminate can be converted with carbon dioxide to insoluble alumina from the soda ash mother liquor solution. This is generally conducted at a temperature of about 77–158° F. The conversion of the sodium aluminate in this manner results in the formation of an insoluble alumina precipitate and water-soluble sodium carbonate. Thereafter, the alumina is separated from the sodium carbonate, such as by filtration, decantation, settling, or the like. The alumina is then calcined to drive off the water by hydration and is ready for ultimate use in the electrolytic production of aluminum metal. A portion of the sodium carbonate solution may then be recycled to the leach liquor and thereby establish the desired soda ash concentration for the leach liquor being utilized. As previously discussed, a small quantity of caustic soda may be added to the leach liquor. Accordingly, such additional caustic may be generated within the process by adding about 5–40 grams of lime (calcium oxide) per liter to the alumina-barren recycle soda ash leach liquor.

Various embodiments of the process of the invention will be further illustrated by the representative examples set forth.

EXAMPLE 1

This example illustrates the effect of varying roasting temperatures upon the amount of aluminum recovered. A sample of dawsonite, $NaAlCO_3(OH)_2$, was prepared synthetically by precipitating the salt with carbon dioxide from a sodium aluminate solution. The X-ray diffraction pattern of the synthetic dawsonite is very similar to natural dawsonite.

The sample of dawsonite was then heated in an oxidizing atmosphere at temperatures from 900° F. to 1400° F. and then leached with hot water for about 15 minutes at atmospheric pressure and at a solids content of 4%. The percent of water-soluble aluminum and percent of theoretical aluminum available as a function of roasting temperature is reported in the following table:

TABLE I

| Roasting temperature (°F.) | Percent soluble aluminum | Percent of theoretical | pH of leach |
|---|---|---|---|
| 900 | 4.7 | 25.1 | 9.2 |
| 1,000 | 5.0 | 26.7 | 9.8 |
| 1,050 | 6.3 | 33.7 | |
| 1,100 | 9.0 | 48.1 | |
| 1,150 | 14.2 | 75.9 | |
| 1,200 | 16.1 | 86.1 | 10.3 |
| 1,300 | 15.5 | 82.8 | |
| 1,400 | 14.0 | 74.8 | 11.1 |

From the above data in Table I it is readily apparent that the highest yield of water-soluble sodium aluminate results from conducting the roasting operation at the intermediate temperatures of about 1150–1300° F.

EXAMPLE 2

Two samples (designated TG–1 core, Nos. 403 and 450) of a Colorado oil shale containing dawsonite, one high in nahcolite (18% sodium bicarbonate content) and one low in nahcolite (3% sodium bicarbonate content), were roasted at temperatures from 1000° F. to 1400° F. for one hour, and then leached at atmospheric pressure with hot water for 15 minutes at a solids content of 4% to extract the water-soluble sodium aluminate therefrom. The results, which illustrate the effect of varying the roasting temperature, are set forth on the following Table II:

TABLE II

| Samples | Roasting temperature (°F.) | Percent water-soluble aluminum |
|---|---|---|
| High nahcolite content oil shale | 1,000 | 1.0 |
| Do | 1,100 | 1.0 |
| Do | 1,200 | 1.3 |
| Do | 1,300 | 1.5 |
| Do | 1,400 | 1.2 |
| Low nahcolite content oil shale | 1,000 | 0.5 |
| Do | 1,100 | 0.7 |
| Do | 1,200 | 1.0 |
| Do | 1,300 | 0.4 |
| Do | 1,400 | 0.1 |

From the above data in Table II it is readily apparent that the highest yield of water-soluble sodium aluminate results from conducting the roasting operation at the intermediate temperatures of about 1100–1300° F. The data in Table II further indicate that the presence of nahcolite (which decomposes to soda ash during the roasting) in association with the dawsonite-bearing oil shale matrix aids in the recovery of water-soluble sodium aluminate therefrom. This is further shown by the fact that when the nahcolite was removed from the big nahcolite content oil shale and the oil shale roasted at 1250° F., the amount of water-soluble aluminum recovered fell from 1.5% to 0.5%.

EXAMPLE 3

This example further illustrates the effect of varying the roasting temperature upon the amount of aluminum recovered. A composite sample (designated TG–1 core) of a Colorado oil shale containing dawsonite was pyrolyzed at 900° F. to produce and recover shale oil vapors therefrom. The resulting spent shale was roasted at temperatures from 1000° F. to 1450° F. until all the carbon was burned off and leached at atmospheric pressure and at ambient temperature for 15 minutes with a 5% soda ash leach liquor, at a solids content of 20%. The roasted blend of sodium aluminate and spent shale ash contained 4.5% alumina. The alumina extraction in percent is reported in the following table:

TABLE III

| Roasting temperature (° F.) | Percent alumina extraction | Dissolved impurities (g. $SiO_2$/liter) |
|---|---|---|
| 900 [1] | 36 | 0.005 |
| 1,000 | 47 | 0.009 |
| 1,100 | 65 | 0.017 |
| 1,150 | 75 | 0.020 |
| 1,225 | 75 | |
| 1,300 | 75 | 0.06 |
| 1,400 | 40 | |
| 1,450 | 0 | 0.25 |

[1] Not roasted.

The data set forth in the above Table III, like that in Tables I and II, also indicate that the maximum recovery of aluminum results at a roasting temperature of about 1100–1300° F. for these additional examples of dawsonite-bearing oil shale and that at the lower roasting temperatures, e.g. 1100° F., less dissolved silica is found in the leach liquor and accordingly, a pure alumina product is obtainable. It is further readily apparent from this example that at roasting temperatures above about 1400° F. the alumina extraction is nil, thus indicating the formation of insoluble aluminum silicates.

EXAMPLE 4

This example illustrates the effect of roasting time upon the recovery of sodium aluminate. Eight samples (designated TG–1 core, Nos. 301, 337, 386, 387, 406, 434, 437, 450) of a Colorado oil shale containing dawsonite were roasted at 1250° F. for approximately 5 minutes or for 30 minutes and then leached at atmospheric pressure with hot water for 15 minutes at a solids content of 4% to extract the water-soluble sodium aluminate therefrom. The percentage of soluble aluminum recovered from the 5-minute roasting operation ranged from a low of 0.4% to a high of 0.9%, while the percentage of soluble aluminum recovered from the 30-minute roasting operation ranged from a low of 0.3% to a high of 1.0%. The data indicate that there is no appreciable difference in the amount of aluminum values recovered during these two varied roasting periods. This shows that the conversion of dawsonite to sodium aluminate by roasting is extremely rapid, if not instantaneous. The important factor is that all the carbon content of the oil shale be burned off by the roasting operation without fusion of the matrix prior to the leaching.

EXAMPLE 5

This example illustrates the effect of leaching time using the different leach liquors. A composite sample (designated TG–1 core, Composite No. 2) of a Colorado oil shale containing dawsonite was roasted at 1250° F. until all the carbon was burned off and then leached at atmospheric pressure and at ambient temperature with different leach liquors, namely, 4% aqueous soda ash and water, at a solids content of 43%. As the leaching progressed, samples were removed and the filtrate analyzed for soluble aluminum. The results are tabulated in the following Table IV:

TABLE IV

| Leaching time (hrs.) | 4% soda ash leach (g. Al/liter) | Water leach (g. Al/liter) |
|---|---|---|
| 0.017 | 3.25 | 0.60 |
| 0.05 | 3.40 | 0.50 |
| 0.08 | 3.50 | 0.45 |
| 0.25 | 3.79 | 0.36 |
| 0.50 | 3.79 | 0.31 |
| 1.0 | 3.63 | 0.29 |
| 24.0 | 3.13 | <0.05 |

It will be noted from the data set forth in the above Table IV that the amount of soluble aluminum recovered by the leaching operation decreases as the leaching time increases and that favorable leaching times are, in general, from about 5 minutes to about 60 minutes.

EXAMPLE 6

This example illustrates the effect of the solids content or pulp dilution during leaching upon the amount of water-soluble sodium aluminate recovered. A composite sample (designated TG-1 core, Composite No. 2) of a Colorado oil shale containing dawsonite was roasted at 1250° F. until all the carbon was burned off and then leached at atmospheric pressure and at ambient temperature for 15 minutes at various pulp dilutions or solids content with the water and soda ash leach liquors. The samples were filtered and washed until all soluble aluminum was removed. The filtrates and washings were analyzed for soluble aluminum. The results are given in the following table wherein the different pulp dilutions or solids content are compared at a solids content of 4% which is taken as 100% recovery.

TABLE V

| Percent solids content | 4% soda ash leach (percent Al recovery) | Water leach (percent Al recovery) |
| --- | --- | --- |
| 4 | 100 | 100 |
| 7 | 100 | 69 |
| 14 | 90 | 34 |
| 24 | 73 | 29 |
| 39 | 57 | 23 |
| 50 | 31 | 18 |

The data in the above Table V indicate that for these samples of dawsonite-bearing oil shale there was a drastic reduction in the aluminum recovery as the solids content increasing when water was used as the leaching solution and the best aluminum recovery was obtained with a water leach liquor at a solids content of about 4-7%. When the soda ash was used as the leach liquor, the maximum aluminum recovery was obtained at a solids content of about 4-24%.

EXAMPLE 7

This example illustrates the effect of varying the relative concentrations of soda ash in an aqueous solution thereof as the leach liquor upon the amount of soluble aluminum values recovered. A composite sample (designated composite TG-1 core) of a Colorado oil shale containing dawsonite was roasted at 1250° F. until all the carbon was burned off and then leached for 15 minutes at atmospheric pressure and ambient temperature at a solids content of 20%. The results, calculated as percent alumina extracted, are given in the following Table VI:

TABLE VI

| Percent soda ash | Percent alumina extracted | pH of leach |
| --- | --- | --- |
| 1 | 63 | 11.2 |
| 3 | 75 | 11.3 |
| 5 | 75 | 11.6 |
| 20 | 75 | 12.0 |
| Saturated | 75 | 12.5 |

The data in the above Table VI indicate that the best recovery of aluminum values was obtained using a 3% saturated aqueous soda ash solution as the leach liquor. The data further indicate that the leach liquor is mildly alkaline.

EXAMPLE 8

This example illustrates the effect of leaching temperatures upon the amount of soluble aluminum recovered. A composite sample (designated composite TG-1 core) of a Colorado oil shale containing dawsonite was roasted at 1250° F. until all the carbon was burned off and then leached for 15 minutes at atmospheric pressure and at a solids content of 20% with a 5% soda ash leach liquor at various temperatures. The results, calculated as soluble alumina in the leach liquor, are set forth in the following Table VII:

TABLE VII

Leach temperature (° F.): Soluble alumina (g./liter)
77 _____ 6.54
104 _____ 6.55
158 _____ 6.60
203 (boiling point) _____ 6.65

The above data indicate that the best recovery of soluble alumina values was obtained at a leaching temperature of 203° F. and that the temperature has a very small effect on the aluminum extraction.

EXAMPLE 9

This example illustrates the effect of adding various small amounts of caustic soda to the soda ash leach liquor to facilitate the additional removal of non-dawsonitic aluminum values, for example gibbsite $$(Al_2O_3 \cdot 3H_2O)$$

A composite sample (designated TG-1 core) of Colorado oil shale containing dawsonite was pyrolyzed at 875° F. to produce and recover shale oil vapors therefrom. The resulting spent shale, having a particle size in the order of 10 mesh to about −325 mesh, was roasted at 1300° F. until all the carbon was burned off and leached with a 4% soda ash solution containing about 0.2–1% added caustic soda at atmospheric pressure and ambient temperature for 15 minutes at a 20% solids content. The roasted sample contained 4.5% alumina. The results are tabulated in the following Table VIII:

TABLE VIII

| Leach solution | Percent alumina extraction | Dissolved impurities (g. SiO₂/liter) |
| --- | --- | --- |
| 0.2% NaOH-4% Na₂CO₃ | 85 | 0.12 |
| 0.5% NaOH-4% Na₂CO₃ | 87 | 0.15 |
| 1.0% NaOH-4% Na₂CO₃ | 90 | 0.22 |

The data set forth in the above Table VIII, when compared to Table III of Example 3, indicate that the maximum recovery of soda ash extractable aluminum can be increased significantly through the addition of a small amount of caustic. However, it is also readily apparent that the dissolved silica increases radically since in Example 3, for the same roasting temperature and approximate soda ash concentration, the dissolved silica amounted to 0.06 gram per liter. Accordingly, the addition of caustic in this instance caused an increase in dissolved silica by about 100–350%.

EXAMPLE 10

This example is illustrative of that embodiment of the invention wherein the recovered sodium aluminate is converted into alumina which can be ultimately be used for the electrolytic production of aluminum metal. Carbon dioxide was bubbled through a sodium aluminate solution (2.84 g. Al₂O₃/liter) at 70° C., and carbon dioxide was also bubbled through another sample of the same sodium aluminate solution at 25° C. In both cases, precipitation of alumina started in approximately 3 minutes. The carbon dioxide was stopped after 15 minutes, the samples were filtered and washed with water. The barren solutions were analyzed for alumina. At 70° C., precipitation of the alumina was 96.9% complete, and at 25° C., precipitation of the alumina was 98.4% complete. The alumina was dried and calcined at 950° C. for 30 minutes.

Although the process of the invention has been described and exemplified mainly in connection with dawsonite-bearing oil shales, it has also been satisfactorily tested with other dawsonite deposits and confirmed by the processing of synthetic dawsonite. Moreover, from the above illustrative examples it will be readily apparent that the conditions of the process of the invention for maximum recovery of aluminum values from dawsonite will be dependent upon the dawsonite-bearing matrix to be treated. However, the suitable conditions will be within the herein described parameters.

It will be appreciated that various modifications and changes may be made in the process of the invention by those skilled in the art, in addition to those set forth above, without departing from the spirit thereof. Therefore, the invention is to be limited only by the scope of the appended claims.

What is claimed is:

1. A process for recovering sodium aluminate from a dawsonite-bearing matrix which comprises
   (1) roasting the dawsonite-bearing matrix in an oxidizing atmosphere at a temperature from about 1000° F. to about 1400° F. to form a blend of sodium aluminate and spent residue; and
   (2) leaching said blend at substantially atmospheric pressure and at ambient temperature to about 212° F. with a leach liquor selected from the group consisting of water and an aqueous soda ash solution, at about 4%–50% solids content to extract the sodium aluminate from said blend and provide a sodium aluminate solution.

2. The process as defined by claim 1 wherein the leach liquor is water.

3. The process as defined by claim 1 wherein the leach liquor is an aqueous alkaline solution containing from about 1% soda ash to a saturated soda ash solution.

4. The process as defined by claim 1 wherein the dawsonite-bearing matrix is roasted according to step (1) at a temperature from about 1100° F. to about 1300° F.

5. The process as defined by claim 3 wherein the leach solution is maintained at a pH of about 9.5 to 13.0.

6. The process as defined by claim 1 comprising the further steps subsequent to step (2) of (3) precipitating alumina from the sodium aluminate solution; and (4) recycling at least a portion of soda ash solution to the leaching step (2).

7. The process as defined by claim 6 comprising the futher step subsequent to step (3) of adding about 5–40 grams calcium oxide per liter of barren recycle soda ash solution of step (4).

8. The process according to claim 1 comprising the further step of adding about 0.2–1.0% caustic soda to the leach liquor of step (2).

9. The process as defined by claim 1 comprising the further steps prior to step (1) of pyrolyzing oil shale containing dawsonite at a temperature of about 750–975° F. to yield shale oil vapors and spent shale, containing dawsonite; and separating the shale oil vapors from the spent shale prior to roasting the spent shale in step (1).

10. A process for recovering a sodium aluminate from a dawsonite-bearing oil shale matrix which comprises
    (1) pyrolyzing oil shale containing dawsonite at a temperature of about 750–975° F. to yield shale oil vapors and spent shale;
    (2) separating the shale oil vapors from the spent shale;
    (3) roasting the spent shale in an oxidizing atmosphere at a temperature from about 1100° F. to about 1300° F. for a period of time sufficient to burn off substantially all of the carbon and to form a finely divided blend of sodium aluminate and spent ash;
    (4) leaching said blend at substantially atmospheric pressure and at ambient temperature to about 212° F. with a leach liquor selected from the group consisting of water and a 1% to saturated aqueous soda ash solution, at about 4%–50% solids content, to extract the sodium aluminate from the blend and provide a sodium aluminate solution;
    (5) precipitating alumina from the sodium aluminate-containing soda ash solution of step (4); and
    (6) recycling at least a portion of the soda ash solution to the leaching step (2).

References Cited

UNITED STATES PATENTS 3,389,975  6/1968  Van Nordstrand _____ 23—315

HERBERT T. CARTER, Primary Examiner

U.S. Cl. X.R.

23—143; 208—11